United States Patent
Morita et al.

(10) Patent No.: US 9,414,320 B2
(45) Date of Patent: Aug. 9, 2016

(54) RADIO COMMUNICATION SYSTEM, COMMUNICATION CONTROL METHOD, RADIO STATION, AND RECORDING MEDIUM

(75) Inventors: Motoki Morita, Tokyo (JP); Kojiro Hamabe, Tokyo (JP)

(73) Assignee: NEC CORPORATION, Tokyo (JP)

(*) Notice: Subject to any disclaimer, the term of this patent is extended or adjusted under 35 U.S.C. 154(b) by 552 days.

(21) Appl. No.: 12/742,187

(22) PCT Filed: Oct. 20, 2008

(86) PCT No.: PCT/JP2008/068961
§ 371 (c)(1),
(2), (4) Date: May 10, 2010

(87) PCT Pub. No.: WO2009/072355
PCT Pub. Date: Jun. 11, 2009

(65) Prior Publication Data
US 2010/0279703 A1    Nov. 4, 2010

(30) Foreign Application Priority Data

Dec. 3, 2007  (JP) .................................. 2007-312258

(51) Int. Cl.
*H04W 52/24*    (2009.01)
*H04W 52/50*    (2009.01)
(Continued)

(52) U.S. Cl.
CPC ............ *H04W 52/12* (2013.01); *H04W 52/244* (2013.01); *H04W 52/146* (2013.01); *H04W 52/241* (2013.01); *H04W 52/346* (2013.01)

(58) Field of Classification Search
CPC ... H04W 52/24; H04W 52/50; H04W 52/367; H04W 52/12; H04W 52/40; H04W 52/146; H04W 52/241; H04W 52/38; H04W 52/04; H04W 72/0413
See application file for complete search history.

(56) References Cited

U.S. PATENT DOCUMENTS

| 6,771,965 | B2 | 8/2004 | Hamabe |
| 7,136,666 | B2 * | 11/2006 | Charriere .............. H04W 52/12 370/335 |

(Continued)

FOREIGN PATENT DOCUMENTS

| CN | 1373620 | 10/2002 |
| CN | 1801663 | 7/2006 |

(Continued)

OTHER PUBLICATIONS

International Search Report, PCT/JP2008/068961, Jan. 13, 2009.

(Continued)

*Primary Examiner* — Bobbak Safaipour
(74) *Attorney, Agent, or Firm* — Young & Thompson

(57) ABSTRACT

To provide appropriate communication quality between a radio station (e.g., small-scale base station) and a mobile station in a state where the radio station is located within a large-scale cell and communicates with the mobile station while reducing interference exerted on the large-scale cell by communication between the radio station and the mobile station regardless of the place of the radio station within the large-scale cell. A femto base station 4 sets a target received power RTWP_target of uplink data used for controlling transmission power of uplink data transmission from a mobile station on an uplink based on a measurement result of received power Pmacro of a pilot signal transmitted from a macro base station 3. Specifically, the target received power RTWP_target is preferably set to a larger value as the received power Pmacro of the pilot signal becomes smaller.

25 Claims, 5 Drawing Sheets

(51) Int. Cl.
*H04W 52/12* (2009.01)
*H04W 52/40* (2009.01)
*H04W 52/14* (2009.01)
*H04W 52/34* (2009.01)

(56) References Cited

U.S. PATENT DOCUMENTS

| | | | |
|---|---|---|---|
| 7,200,403 B2 | 4/2007 | Hamabe | |
| 9,253,656 B2* | 2/2016 | Kwon | H04J 11/0026 |
| 2002/0049061 A1* | 4/2002 | Pinola | H04W 16/10 455/452.2 |
| 2002/0082015 A1* | 6/2002 | Wu | H04L 29/06 455/436 |
| 2003/0036403 A1* | 2/2003 | Shiu | H04W 52/12 455/522 |
| 2003/0053413 A1* | 3/2003 | Sawahashi | H04B 1/692 370/208 |
| 2003/0072294 A1* | 4/2003 | Wei | H04W 24/00 370/345 |
| 2003/0228870 A1* | 12/2003 | Ishiguro | H04W 36/12 455/439 |
| 2004/0127191 A1 | 7/2004 | Matsunaga | |
| 2004/0224692 A1* | 11/2004 | Hamabe | H04W 88/08 455/442 |
| 2004/0242257 A1* | 12/2004 | Valkealahti | H04W 16/06 455/522 |
| 2005/0063355 A1* | 3/2005 | Iwamura | H04B 3/542 370/351 |
| 2005/0130662 A1 | 6/2005 | Murai | |
| 2005/0208961 A1* | 9/2005 | Willenegger | H04L 1/20 455/522 |
| 2005/0277419 A1* | 12/2005 | Takano | H04W 52/40 455/442 |
| 2006/0073791 A1* | 4/2006 | Senarath | H04W 52/146 455/67.13 |
| 2007/0049317 A1* | 3/2007 | Qi | H04W 52/54 455/522 |
| 2007/0173279 A1* | 7/2007 | Kuroda | H04W 52/12 455/522 |
| 2007/0218914 A1 | 9/2007 | Mori et al. | |
| 2007/0270151 A1 | 11/2007 | Claussen et al. | |
| 2008/0254820 A1* | 10/2008 | Alpert | H04W 52/40 455/522 |
| 2008/0268864 A1* | 10/2008 | Andersson | H04L 12/5695 455/453 |
| 2009/0052330 A1* | 2/2009 | Matsunaga | H04L 1/0019 370/242 |
| 2010/0093351 A1* | 4/2010 | Barrett | H04W 36/0083 455/436 |
| 2011/0201367 A1* | 8/2011 | Aminaka | H04W 72/02 455/501 |
| 2015/0045084 A1* | 2/2015 | Morimoto | H04W 52/40 455/522 |

FOREIGN PATENT DOCUMENTS

| | | |
|---|---|---|
| EP | 1467499 | 10/2004 |
| JP | 2002-291025 | 10/2002 |
| JP | 2004-207839 | 7/2004 |
| JP | 2006-197534 | 7/2006 |
| JP | 2006-246334 | 9/2006 |
| JP | 2006-339751 | 12/2006 |
| JP | 2007-251755 | 9/2007 |

OTHER PUBLICATIONS

3GPP TS 25.214 V7.30 (Dec. 2006) 3rd Generation Partnership Project; Technical Specification Group Radio Access Network; Physical layer precedures (FDD) (Release 7) (Dec. 2006).

3GPP TS 36.300 V8.1.0 (Jun. 2007), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) (Jun. 2007).

CN Office Action dated Oct. 10, 2012, with English Translation; Application No. 200880119116.X.

Supplementary European Search Report dated Mar. 31, 2015 in corresponding European Patent Application No. 08857971.

* cited by examiner

RADIO COMMUNICATION SYSTEM, COMMUNICATION CONTROL METHOD, RADIO STATION, AND RECORDING MEDIUM

TECHNICAL FIELD

The present invention relates to a radio communication system including a radio station, in particular a radio communication system in which at least a radio station autonomously performs radio resource management for an uplink, a communication control method, a radio station, and a recording medium.

BACKGROUND ART

In recent years in which mobile phones have become widespread, as the demand for indoor voice communication and data communication has grown, the development of a home-use base station installed indoors has been pursued. As a form of operation of such a home-use base station, a way of implementing communication in which only a pre-registered mobile phone(s) is connected to a home-use base station has been studied. Since a range covered by a home-use base station is considerably smaller than that of a base station installed outdoors (hereinafter called "macro base station"), the range is called "femtocell". Accordingly, a home-use base station is referred to as "femto base station" hereinafter.

Femto base stations as well as base stations in existing mobile communication networks transmit a common pilot signal. A mobile station performs synchronization establishment, channel estimation, and the like by receiving such a common pilot signal in order to establish a line, and then performs data transmission/reception with a base station. Therefore, it is necessary to be able to receive a common pilot signal with appropriate receiving quality in a mobile station in order to provide appropriate communication quality.

Further, as data transmission from a base station to a mobile station on the downlink has been speeded up, data transmission from the mobile station to the base station on the uplink has been also speeded up. To achieve the speedup of data transmission on the uplink, a technique to maximize the data transmission rate by maximizing the transmission power of the mobile station within the range in which the total amount of the received power (RTWP: Received Total Wideband Power) of all the channels in the base station remains at or below a predetermined target value has been known. The target value of RTWP is set in a fixed manner in each base station.

The femto base station like the one described above has been studied for use in systems such as WCDMA (Wideband Code Division Multiple Access) and E-UTRAN (Enhanced UMTS Terrestrial Radio Access Network). In WCDMA, data transmission is performed by using a dedicated channel, of which transmission power is controlled, on an uplink and a downlink, or performed by using a shared channel on a downlink as shown in Non-patent document 1. Further, in E-UTRAN, a radio frequency band is divided into a plurality of PRBs (Physical Resource Blocks) as shown in Non-patent document 2. Furthermore, a scheduler provided in an E-UTRAN base station assigns PRBs, and a base station performs data transmission with a mobile station by using an assigned PRB.

[Non Patent Document 1]
3GPP TS 25.214 V7.3.0 (2006-12), 3rd Generation Partnership Project; Technical Specification Group Radio Access Network; Physical layer procedures (FDD) (Release 7)

[Non Patent Document 2]
3GPP TS 36.300 V8.1.0 (2007-06), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)

DISCLOSURE OF INVENTION

Technical Problem

FIG. 8 shows an example of a system including a macro base station and femto base stations. In the example shown in FIG. 8, femto base stations 82A and 82B are located within a macrocell 801 formed by a macro base station 81. The femto base stations 82A and 82B form femtocells 802A and 802B respectively. The femto base station 82A is located near the macro base station 81, and the femto base station 82B is located near the cell edge of the macrocell 801. Mobile stations 91A and 91B communicate with the femto base stations 82A and 82B respectively, and both of the mobile stations 91C and 91D communicate with the macro base station 81. The mobile station 91C moves in the vicinity of the macro base station, and the mobile station 91D moves near the cell edge of the macrocell 801.

The communication quality on the uplink of each of the femto base stations 82A and 82B is analyzed hereinafter on the assumption that the target RTWP of both of the femto base stations 82A and 82B is set to a value substantially equal to that of the macro base station 81. Note that the following analysis has been made by the inventors of the present application to examine the problems of the femto base station in the related art described above, and is not technical matters disclosed in publicly-known literatures or the like.

The femto base station 82A is mainly subjected to uplink interference from the mobile station 91C moving in the vicinity thereof. The term "uplink interference" means interference on an uplink from a mobile station to a base station. However, since the mobile station 91C is moving in the vicinity of the macro base station 81, the transmission power of the mobile station 91C is relatively smaller than that in the case where the mobile station 91 C is located near the cell edge of the macrocell 801. Therefore, since the interference that the femto base station 82A is subjected to from the mobile station 91C is relatively small, RTWP of the femto base station 82A can be kept below or equal to the target value. Accordingly, the communication quality on the uplink in the femto base station 82A does not deteriorate.

Meanwhile, the femto base station 82B is mainly subjected to uplink interference from the mobile station 91D moving in the vicinity thereof. Since the mobile station 91D is moving in a place far away from the macro base station, the transmission power of the mobile station 91D is relatively large. Therefore, since the interference that the femto base station 82B is subjected to from the mobile station 91D could become remarkably larger, RTWP of the femto base station 82B could frequently exceed the target value. Accordingly, the mobile station 91B, which communicates with the femto base station 82B, cannot make full use of its transmission power, and the communication quality on the uplink in the femto base station 82B deteriorates. For example, the uplink data transmission rate of the mobile station 91B decreases significantly.

Next, the communication quality on the uplink of each of the femto base stations 82A and 82B is analyzed again hereinafter on the assumption that the target received power RTWP_target of both of the femto base stations 82A and 82B is set to a larger value. In this case, since the target RTWP of the femto base station 82A is excessively high, the transmission power of the mobile station 91A could become excessively large. As a result, if the interference from the mobile station 91A to the macro base station 81 increases, the communication quality of the mobile stations 91C and 91D, which communicate with the macro base station 81, deteriorates. Meanwhile, in the femto base station 82B, since the target RTWP is increased to such a level that the uplink interference from the mobile station 91D becomes tolerable, the frequency with which RTWP exceeds the target value can be reduced. As a result, the mobile station 91B, which communicates with the femto base station 82B, can maximize the transmission power, and therefore the communication quality does not deteriorate.

As has been described so far, in the conventional method in which the target RTWP of a femto base station is set in a fixed manner without taking the place of the femto base station within the macrocell into consideration, there are problems that, depending on the place of the femto base station within the macrocell, the communication quality between the femto base station and mobile station connecting to the femto base station could deteriorate due to the interference from the macrocell to the femtocell and that the interference from the femtocell to the macrocell could increase.

The present invention has been made based on the above-described findings, and an object of the present invention is to provide appropriate communication quality within a femtocell while reducing the interference from the femtocell to a macrocell regardless of the place of the femto base station within the macrocell. More generally speaking, an object of the present invention is to provide a radio communication system, a communication control method, a radio station, and a control program of a radio station capable of providing appropriate communication quality between a radio station and a mobile station in a state where the radio station is located within a large-scale cell and communicates with the mobile station while reducing interference exerted on the large-scale cell by communication between the radio station and the mobile station regardless of the place of the radio station within the large-scale cell.

Technical Solution

A radio communication system in accordance with a first aspect of the present invention includes a first base station and a radio station. The first base station transmits a first pilot signal within a first cell formed by the first station itself. The radio station communicates with a mobile station, and sets a target received power of uplink data based on reception quality of the first pilot signal. The target received power of the uplink data is used to control transmission power of the uplink data by the mobile station.

A second aspect of the present invention includes a communication control method in a radio station that is used with a first base station in a radio communication system and performs radio communication with a mobile station. The method includes: (1) receiving a measurement result of reception quality of a pilot signal transmitted from the first base station; and (2) setting target received power of uplink data that is used to control transmission power of the uplink data by the mobile station based on reception quality of the pilot signal.

A third aspect of the present invention is a radio station that is used with a first base station in a radio communication system and performs radio communication with a mobile station. The radio station includes: radio transmission/reception means for communicating with the mobile station; and control data setting means for setting target received power of uplink data that is used to control transmission power of the uplink data by the mobile station based on reception quality of a pilot signal transmitted from the first base station.

A fourth aspect of the present invention is a radio-station control program that causes a computer to execute control processing relating to a radio station that is used with a first base station in a radio communication system and communicates with a mobile station. Note that the control processing includes: receiving a measurement result of reception quality of a pilot signal transmitted from the first base station; and setting target received power of uplink data that is used to control transmission power of the uplink data by the mobile station based on reception quality of the pilot signal.

Advantageous Effects

In accordance with each aspect of the present invention, the target received power of uplink data from a mobile station can be determined according to the reception quality of a pilot signal transmitted from a first base station. In this way, in the case where the radio station in each of the above-described aspects of the present invention is a femto base station, for example, if the femto base station is located in the vicinity of the macro base station and the reception level of a pilot signal from the macro base station observed at the femto base station is thereby large, the target received power of the femto base station can be lowered so that the increase in the transmission power of the mobile station communicating with the femto base station can be suppressed. Further, if the femto base station is located far away from the macro base station and the reception level of a pilot signal from the macro base station observed at the femto base station is thereby small, the target received power of the femto base station can be raised so that the decrease in the data transmission rate of the mobile station can be prevented.

Therefore, in accordance with the present invention, it is possible to provide appropriate communication quality between a radio station such as a small-scale base station and a mobile station in a state where the radio station is located within a large-scale cell and communicates with a mobile station while reducing interference exerted on the large-scale cell by communication between the radio station and the mobile station regardless of the place of the radio station within the large-scale cell.

EXPLANATION OF REFERENCE

1 MACRO GATEWAY APPARATUS
2 FEMTO GATEWAY APPARATUS
3 MACRO BASE STATION
4 Femto Base Station
5 MACROCELL
6 FEMTOCELL
7-1 TO 7-4 MOBILE STATION
10 NETWORK
30 ANTENNA
31 RADIO TRANSMISSION/RECEPTION UNIT
32 RECEIVED DATA PROCESSING UNIT
33 TRANSMISSION DATA PROCESSING UNIT
34 WIRED TRANSMISSION/RECEPTION UNIT
35 RADIO NETWORK CONTROL UNIT
36 MOBILE-STATION MODE RECEIVING UNIT
37 RADIO NETWORK CONTROL DATA SETTING UNIT

BEST MODE FOR CARRYING OUT THE INVENTION

Figure 1:
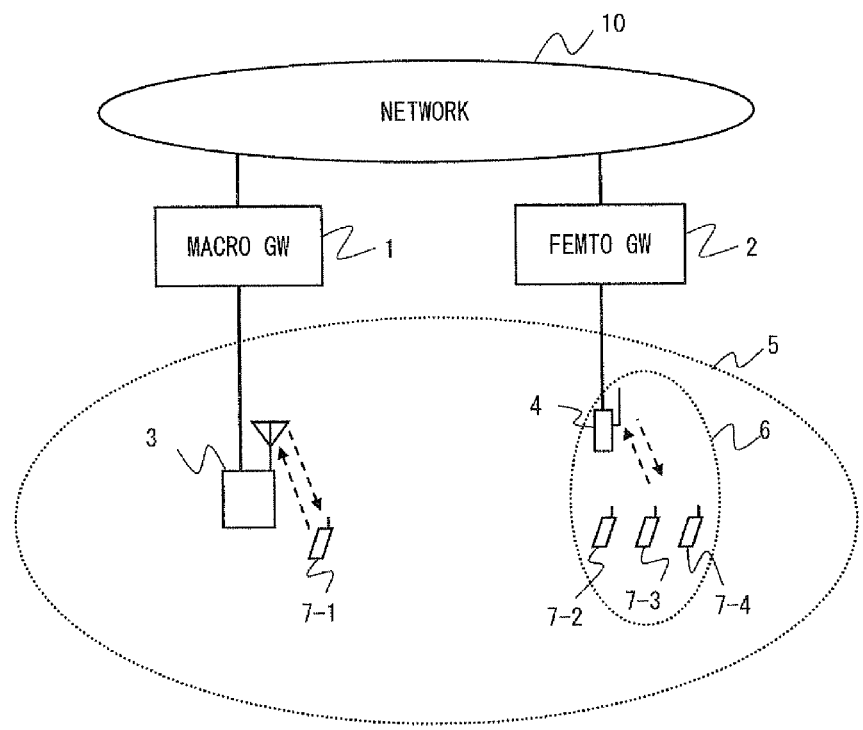
FIG. 1 shows a configuration of a radio communication system in accordance with first to fourth exemplary embodiments of the present invention.

Next, exemplary embodiments of the present invention are explained in detail with reference to the drawings. FIG. 1 is a configuration diagram common to radio communication systems in accordance with first to fourth exemplary embodiments of the present invention. The radio communication system includes a macro gateway apparatus 1, a femto gateway apparatus 2, a macro base station 3, a femto base station 4, a macrocell 5, a femtocell 6, and mobile stations 7-1 to 7-4.

The macro base station 3 and the femto base station 4 form the macrocell 5 and the femtocell 6 respectively. The macro base station 3 communicates with the mobile station 7-1, and the femto base station 4 communicates with the mobile station 7-2. The number of cells formed by each of the macro base station 3 and the femto base station 4 may be more than one. However, each of the macro base station 3 and the femto base station 4 forms one cell in this exemplary embodiment for simplifying the explanation. The radio communication system in accordance with this exemplary embodiment may also include a number of other macro base stations and femto base stations, macrocells and femtocells corresponding to those base stations, and mobile stations in addition to those shown in FIG. 1. However, their illustration is omitted in the figure.

The macro gateway apparatus 1 is connected to the macro base station 3. The femto gateway apparatus 2 is connected to the femto base station 4. Further, these gateway apparatuses 1 and 2, which are also connected to a network 10 of a higher layer, control communication and perform information transmission between the higher network 10 and the mobile stations 7-1 to 7-4 located within the cell of a subordinate base station.

All of the mobile stations 7-1 to 7-4 are permitted to connect to the macro base station 3. Meanwhile, the identifiers of only the mobile stations 7-2 to 7-4 are registered in the femto base station 4, and only the mobile stations 7-2 to 7-4 are thereby permitted to connect to the femto base station 4 as a pre-registered mobile station.

To permit the connection only to specified mobile stations, the femto base station 4 transmits cell identification number information by using a common control channel, and also transmits connection restriction information indicating that it is a cell that permits the connection only to specified mobile stations. Meanwhile, each of the mobile stations 7-2 to 7-4 retains the cell identification number information of a cell for which the connection is permitted. Further, when connection restriction information and cell identification number are being transmitted in the femtocell 6, if the transmitted cell identification number matches with the retained cell identification number, the mobile stations 7-2 to 7-4 connect to the cell as a cell selection candidate.

The macro base station 3 and the femto base station 4 communicate with a mobile station by using the same radio frequency. Further, the macro base station 3 transmits a pilot signal with a constant transmission power by the CPICH (Common Pilot Channel) of the downlink in the macrocell 5. Meanwhile, the femto base station 4 autonomously sets the transmission power of a common pilot signal, and transmits a common pilot signal by the CPICH in the femtocell 6.

Further, each of the macro base station 3 and the femto base station 4 transmits downlink data to a mobile station by using a downlink data channel, and receives uplink data from a mobile station by using an uplink data channel.

In the uplink data reception in the femto base station 4, the femto base station 4 controls the data transmission rate by using a target received power RTWP_target. That is, the target received power RTWP_target is a parameter that is used as a reference value in the transmission power control in which the transmission power on the uplink of a mobile station is determined.

Each of the mobile stations 7-2 to 7-4 starts data transmission with a constant data transmission rate, and the femto base station 4 measures RTWP as the total amount of the received power in the femto base station 4 while receiving uplink data transmitted from the mobile stations 7-2 to 7-4. Then, if RTWP is smaller than its RTWP_target, the femto base station 4 instructs the mobile stations 7-2 to 7-4 to increase the data transmission rate, whereas if RTWP is larger than RTWP_target, the femto base station 4 instructs the mobile stations 7-2 to 7-4 to decrease the data transmission rate. Meanwhile, the mobile stations 7-2 to 7-4 increase/decrease the data transmission rate in accordance with the instruction, and perform data transmission by increasing/decreasing the transmission power so that the transmission power per information bit remains unchanged. With the control like this, the femto base station 4 can perform uplink data reception at the maximum rate while preventing RTWP from significantly exceeding RTWP_target. Details of the setting method of RTWP_target as a radio parameter are explained with exemplary embodiments shown below.

Note that although the exemplary embodiments adopt a FDD (Frequency Division Duplex) mode in which different radio frequencies are used in the uplink and downlinks, the present invention can be also practiced in a similar manner in embodiments using a TDD (Time Division Duplex) mode in which the same radio frequency is used in both the uplink and downlinks by dividing the radio frequency in a time-division manner.

Further, although explanation is made by using a radio communication system including a macro base station and a femto base station throughout the exemplary embodiments, the present invention can be also practiced in a similar manner in embodiments in which the macro base station is replaced by any other base station that is larger than the femto station and smaller than the macro station such as a micro base station or a pico base station. Further, the present invention can be also practiced in a similar manner in embodiments in which the femto base station is replaced by any other base station that is smaller than the macrocell in the higher layer such as a micro base station or a pico base station.

[First Exemplary Embodiment]

A radio communication system in accordance with this exemplary embodiment may adopt any mode as the communication mode between a base station and a mobile station. However, a CDMA mode is adopted as the radio access mode in a first exemplary embodiment, and each of the macro base station 3, the femto base station 4, and each of the mobile stations 7-1 to 7-4 spreads a transmission signal over a predetermined radio frequency band to transmit information. Further, the macro gateway apparatus 1 in accordance with the first exemplary embodiment is equipped with an RNC (Radio Network Controller) function. In this way, the macro gateway apparatus 1 notifies the macro base station 3 of a predetermined radio frequency, a transmission power of a common pilot signal, and the like of the macrocell 5.

Figure 2:
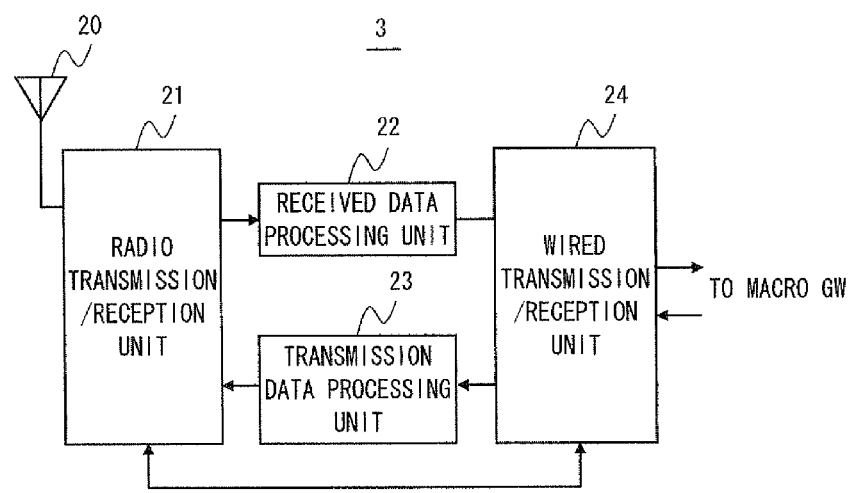
FIG. 2 shows a configuration of a macro base station in accordance with first and second exemplary embodiments of the present invention.

FIG. 2 shows an example of a configuration of a macro base station 3. Referring to FIG. 2, the macro base station 3 in accordance with this exemplary embodiment includes an antenna 20, a radio transmission/reception unit 21, a received data processing unit 22, a transmission data processing unit 23, and a wired transmission/reception unit 24.

The radio transmission/reception unit 21 receives a notification of the radio frequency, the transmission power of a common pilot signal, and the like of the macrocell 5 from the macro gateway apparatus 1 through the wired transmission/reception unit 24, and transmits a common pilot signal based on the notification. Further, the radio transmission/reception unit 21 receives downlink data from the macro gateway apparatus 1 through the wired transmission/reception unit 24 and the transmission data processing unit 23, and transmits the received downlink data through the antenna 20 toward the mobile station 7-1. Further, the radio transmission/reception unit 21 receives uplink data from the mobile station 7-1 through the antenna 20, and transmits the received uplink data to the macro gateway apparatus 1 through the received data processing unit 22 and the wired transmission/reception unit 24.

Figure 3:
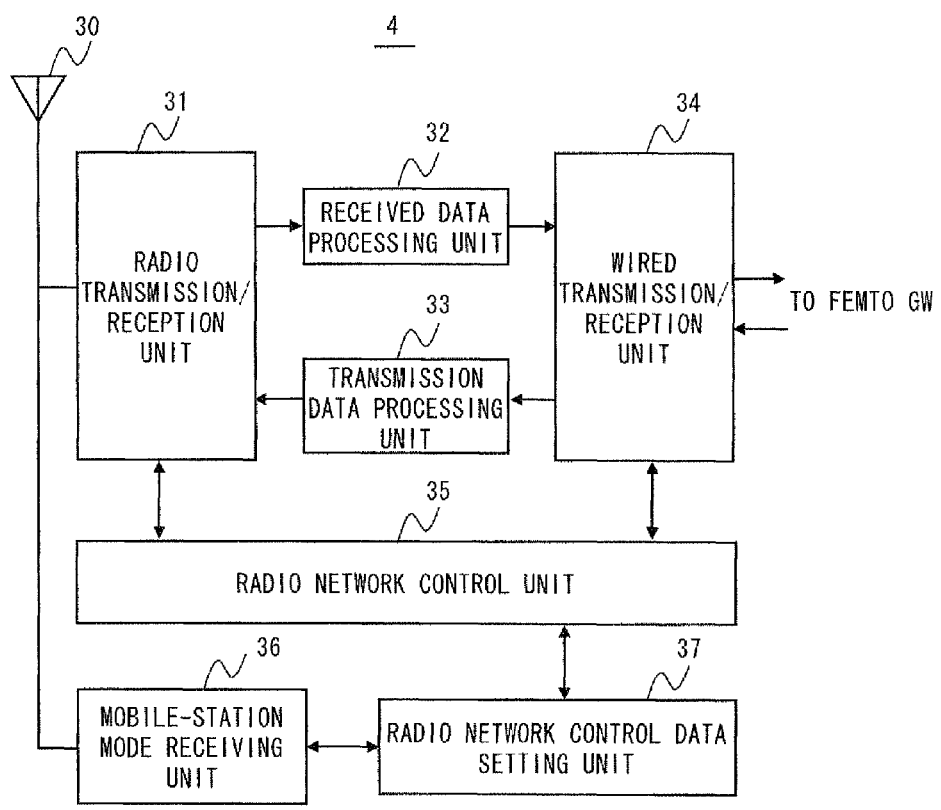
FIG. 3 shows a configuration of a femto base station in accordance with first to fourth exemplary embodiments of the present invention.

FIG. 3 shows an example of a configuration of a femto base station 4. Referring to FIG. 3, the femto base station 4 in accordance with this exemplary embodiment includes an antenna 30, a radio transmission/reception unit 31, a received data processing unit 32, a transmission data processing unit 33, a wired transmission/reception unit 34, a radio network control unit 35, a mobile-station mode receiving unit 36, and a radio network control data setting unit 37.

The mobile-station mode receiving unit 36 measures the received power P_macro of a common pilot signal that is being transmitted in the macrocell 5 through the antenna 30.

The radio network control data setting unit 37 receives a notification of the received power P_macro of a common pilot signal measured by the mobile-station mode receiving unit 36, and determines the transmission power of the common pilot signal by the femto base station 4 and the target received power RTWP_target in the uplink data reception from the mobile stations 7-2 to 7-4. Specifically, the transmission power of the common pilot signal may be determined by adding a predetermined power offset value to the P_macro. The determined transmission power of the common pilot signal and the target received power RTWP_target in the uplink data reception are sent to the radio network control unit 35.

The radio network control unit 35 in accordance with this exemplary embodiment, which is equipped with an RNC function, notifies the radio transmission/reception unit 31 of a radio frequency to be used, the transmission power of a common pilot signal, and the target received power RTWP_target on the uplink. Then, the radio transmission/reception unit 31 receives the radio frequency, the transmission power value of a common pilot signal, and the target received power RTWP_target on the uplink from the radio network control unit 35, transmits a common pilot signal based on the notification, and thereby performs data transmission/reception of downlink/uplink data in a similar manner to that of the radio transmission/reception unit 21 of the macro base station 3.

Figure 4:
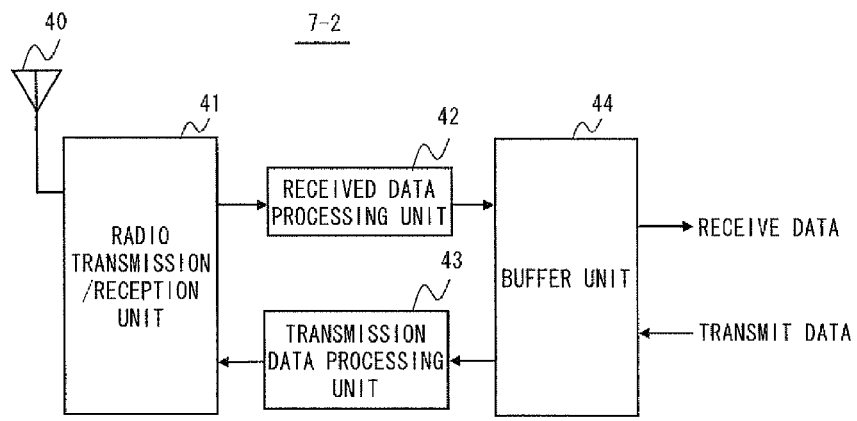
FIG. 4 shows a configuration of a mobile station in accordance with first to fourth exemplary embodiments of the present invention.

FIG. 4 shows an example of a configuration of a mobile station 7-2 in accordance with this exemplary embodiment. Note that each of the other mobile stations 7-1, 7-3 and 7-4 may have a configuration similar to that of FIG. 4. Referring to FIG. 4, the mobile station 7-2 in accordance with this exemplary embodiment includes an antenna 40, a radio transmission/reception unit 41, a received data processing unit 42, a transmission data processing unit 43, and a buffer unit 44.

The radio transmission/reception unit 41 receives downlink data through the antenna 40, and transmits the received downlink data to the buffer unit 44 through the received data processing unit. The downlink data stored in the buffer unit 44 is read out and used according to its purpose. Further, the radio transmission/reception unit 41 receives uplink data stored in the buffer unit 44 through the transmission data processing unit 43, and transmits the received uplink data through the antenna 40 toward a base station.

Figure 5:
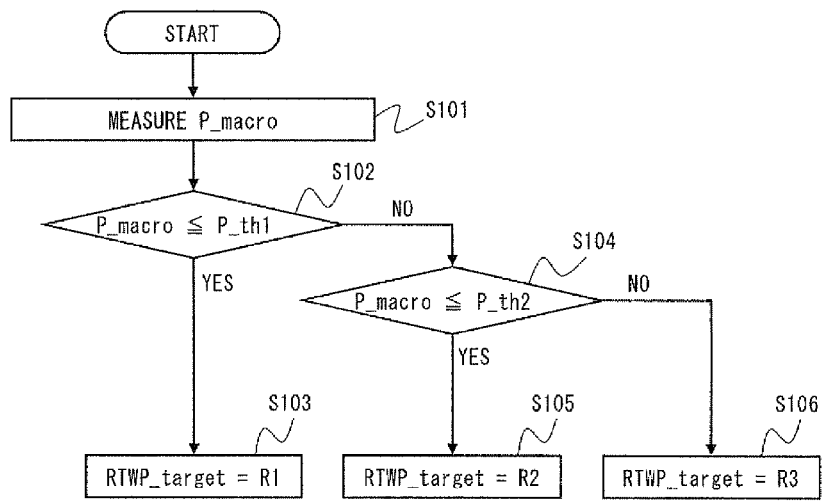
FIG. 5 is a flowchart illustrating setting procedure of target received power in a femto base station in accordance with first to third exemplary embodiments of the present invention.

Next, details of the setting procedure of RTWP_target performed by the femto base station 4 in accordance with the exemplary embodiment are explained in detail hereinafter. FIG. 5 is a flowchart showing an example of procedure through which the femto base station 4 in accordance with this exemplary embodiment sets RTWP_target.

Referring to FIG. 5, in a step S101, the femto base station 4 measures the received power P_macro of a common pilot signal of the macro base station 3. When the femto base station 4 performs measurement of P_macro, it preferably suspends the transmission of all radio signals and enters a mobile-station mode in which the femto base station 4 receives a common pilot signal transmitted from the macro base station 3. Note that in the flowchart of FIG. 5, each symbol such as P_macro represents a decibel value.

In steps S102 to S106, the measured P_macro is compared in magnitude with predetermined thresholds P_th1 and P_th2. Then, RTWP_target is determined by selecting one of three predetermined candidate values R1, R2 and R3 for RTWP_target according to the comparison result. Note that the threshold P_th1 for P_macro is a value smaller than the threshold P_th2 (P_th1<P_th2). Further, the relation in magnitude among the three candidate values R1, R2 and R3 for RTWP_target is expressed as "R1>R2>R3".

Specifically, if P_macro is equal to or smaller than P_th1 (Yes in step S102), RTWP_target is set to R1 (S103). If P_macro is larger than P_th1 and not larger than P_th2 (Yes in step S104), RTWP_target is set to R2 (S105). If P_macro is larger than P_th2 (No in step S104), RTWP_target is set to R3 (S106).

The thresholds P_th1 and P_th2 may be determined by measuring actual outdoor propagation environments corresponding to various distances, or may be determined by calculating from a theoretical model such as Okumura model and Hata model. In the case of the outdoor environment, RTWP_target is determined according to the cell design such as a cell radius. In this exemplary embodiment, R3 may be set to a value substantially equal to that in an outdoor environment. Further, R3 may be determined such that when the femto base station 4 is installed outdoors in a place away from the macro base station 3 by a predetermined first distance and the mobile station 7-2 is located in a place away from the femto base station 4 by a predetermined second distance, the interference exerted on the macro base station 3 by the mobile station 7-2 becomes an acceptable level. R2 and R1 may be determined so that they increase in the order of R3, R2 and R1 in increments of 10 dB.

Further, although an example in which the number of thresholds for P_macro is two and the number of setting values for RTWP_target is three is explained in this exemplary embodiment, needless to say, actual numbers are not limited to these numbers and larger numbers as well as smaller numbers than those of the exemplary embodiment may be also used.

Furthermore, an example in which RTWP_target is set in a stepped manner according to the magnitude of P_macro is shown in the above explanation made with reference to FIG. 5. However, RTWP_target may be set so that RTWP_target varies in inverse proportion to P_macro when it is calculated in true values. Specifically, RTWP_target may be calculated from the following calculation formula (1) expressed in decibel value.

$$RTWP\_target = Median(RTWP\_target\_default + (Pmacro\_default - Pmacro), RTWP\_target\_max, RTWP\_target\_min) \quad (1)$$

Note that RTWP_target_default is a fixed value equal to R3 of this exemplary embodiment. P_macro_default is the received power of a common pilot signal observed at a place away from the macro base station 3 by a predetermined first distance (which is used to determine RTWP_target_default). Further, RTWP_target_max and RTWP_target_min are the maximum value and the minimum value, respectively, of RTWP_target.

With the setting based on the calculation formula (I), RTWP_target can be set according to the distance from the macro base station 3. As a result, since RTWP_target becomes smaller in a femto base station 4 located in the vicinity of the macro base station 3, the increase in the transmission power of the mobile stations 7-2 to 7-4 communicating the femto base station 4 can be suppressed and the interference on the uplink of the macro base station 3 can be thereby suppressed. Meanwhile, since RTWP_target becomes larger in a femto base station 4 located far away from the macro base station 3, the mobile stations 7-2 to 7-4 communication with the femto base station 4 can make full use of their transmission power and thereby prevent the decrease in the data transmission rate.

[Second Exemplary Embodiment]

A femto base station 4 in accordance with a second exemplary embodiment of the present invention measures the reception quality Ec/No (energy per chip to noise density) of the common pilot signal of a macro base station 3 instead of P_macro of the first exemplary embodiment, and uses the measured reception quality Ec/No to determine RTWP_target. Similarly to P_macro, Ec/No has, in principle, a tendency to decrease as the distance from the macro base station 3 increases. Therefore, the setting procedure of RTWP_target in the femto base station 4 can be obtained just by replacing P_macro with Ec/No in the flowchart shown in FIG. 5. Configurations and operations other than this feature may be the same as those of the first exemplary embodiment, and therefore duplicated explanation is omitted.

[Third Exemplary Embodiment]

Although a WCDMA mode is adopted as a communication mode between a base station and a mobile station in the first and second exemplary embodiments, a single carrier FDMA (Frequency Division Multiple Access) mode and an OFDM (Orthogonal Frequency Division Multiplexing) mode are adopted on the uplink and downlinks respectively in a third exemplary embodiment. Further, in the radio communication system in accordance with this exemplary embodiment, the radio frequency band is divided into a plurality of PRBs (Physical Resource Blocks), and a scheduler provided in the macro base station 3 and femto base station 4 performs the assignment of the PRBs. Each of the macro base station 3 and the femto base station 4 performs data communication with a mobile station by using a PRB assigned by the scheduler.

In this case, while the target received power RTWP_target is used as the target value of the received power of each PRB on the uplink of the femto base station 4, the transmission power of each PRB by the mobile stations 7-2 to 7-4 may be decreased according to channel quality and/or the amount of transmission data.

Although the macro gateway apparatus 1 in accordance with the first exemplary embodiment is equipped with the RNC (Radio Network Controller) function, the macro gateway apparatus 1 in accordance with the third exemplary embodiment does not have the RNC function. Instead, the macro base station 3 is equipped with the RNC function.

Figure 6:
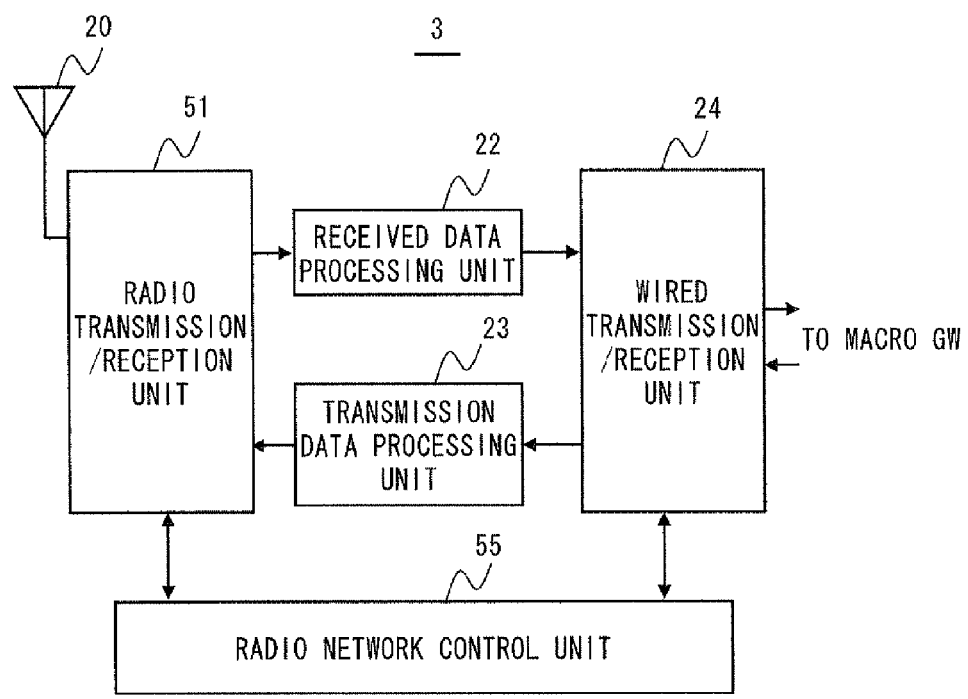
FIG. 6 shows a configuration of a macro base station in accordance with third and fourth exemplary embodiments of the present invention.

FIG. 6 shows an example of a configuration of a macro base station 3 in accordance with a third exemplary embodiment of the present invention. Referring to FIG. 6, the macro base station 3 in accordance with this exemplary embodiment includes an antenna 50, a radio transmission/reception unit 51, a received data processing unit 52, a transmission data processing unit 53, a wired transmission/reception unit 54, and a radio network control unit 55.

The radio transmission/reception unit 51 receives downlink data from the macro gateway apparatus 1 through the wired transmission/reception unit 24 and the transmission data processing unit 23, and transmits the received downlink data through the antenna 20 toward the mobile station 7-1. Further, the radio transmission/reception unit 51 receives uplink data from the mobile station 7-1 through the antenna 20, and transmits the received uplink data to the macro gateway apparatus 1 through the received data processing unit 22 and the wired transmission/reception unit 24. The radio network control unit 55 retains control parameters such as a radio frequency for each cell and a transmission power of a common pilot signal, and notifies these control parameters to the radio transmission/reception unit 51. The radio transmission/reception unit 51 uses the control parameters, which are not notified from the macro gateway apparatus 1 but are notified from the radio network control unit 25, to perform radio communication with the mobile station 7-1.

Note that the other components may be the same as those of the macro base station 3 of the first exemplary embodiment explained above with reference to FIG. 2. Further, configurations of the femto base station 4 and the mobile stations 7-1 to 7-4 in accordance with this exemplary embodiment may be also the same as those of above-explained first exemplary embodiment. Furthermore, the setting procedure of radio parameters performed by the femto base station 4, i.e., the setting procedure of the target received power RTWP_target may be also the same as those of above-explained first exemplary embodiment.

[Fourth Exemplary Embodiment]

A femto base station 4 in accordance with a fourth exemplary embodiment of the present invention measures the reception quality Ec/No of the common pilot signal of a macro base station 3 instead of P_macro in the third exemplary embodiment, and uses the measured reception quality Ec/No to determine RTWP_target. The setting procedure of RTWP_target in the femto base station 4 can be obtained just by replacing P_macro with Ec/No in the flowchart shown in FIG. 5. Configurations and operations other than this feature may be the same as those of the third exemplary embodiment, and therefore duplicated explanation is omitted.

[Fifth Exemplary Embodiment]

Figure 7:
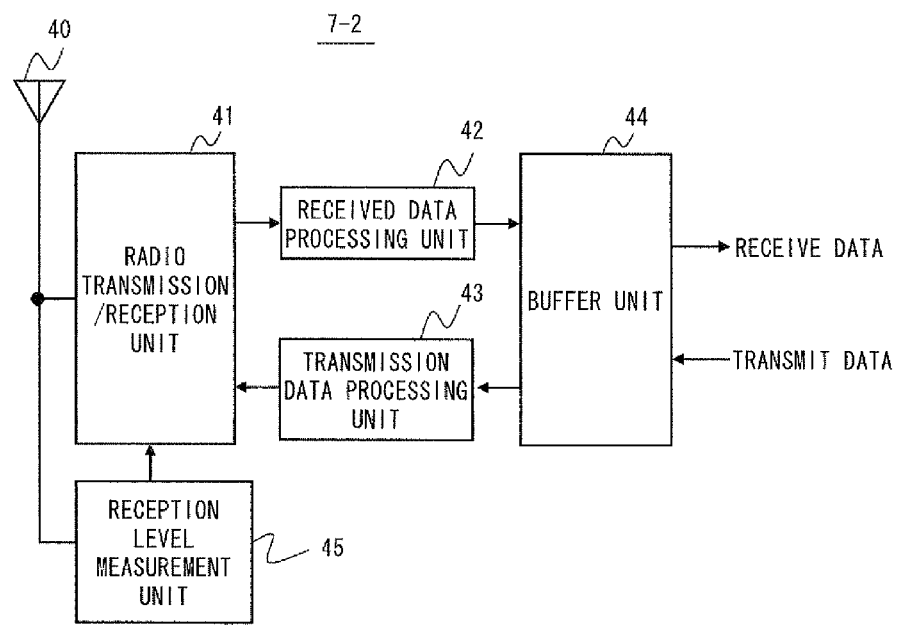
FIG. 7 shows a configuration of a mobile station in accordance with fifth exemplary embodiment of the present invention.
Figure 8:
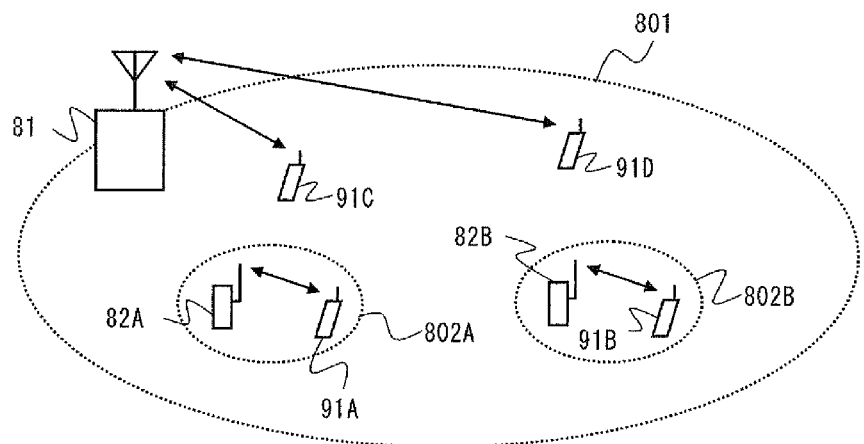
FIG. 8 is a system configuration diagram for explaining a problem to be solved.

In the first to fourth exemplary embodiments, the femto base station 4 performs the measurement of the received power Pmacro of a common pilot signal from the macro base station 3. Instead, at least one of the mobile stations 7-2 to 7-4 communicating with the femto base station 4 measures Pmacro and notifies its result to the femto base station 4 in a fifth exemplary embodiment of the present invention. FIG. 7 shows a configuration of a mobile station 7-2 in accordance with this exemplary embodiment. Note that each of the other mobile stations 7-1, 7-3 and 7-4 may have a similar configuration to that of FIG. 7.

In FIG. 7, a reception revel measurement unit 45 is added in the configuration of FIG. 4. The reception revel measurement unit 45 measures received power Pmacro of a pilot signal transmitted in the macrocell through an antenna 40. The measurement result is processed in a radio transmission/reception unit 41, and transmitted to the femto base station 4 through the antenna 40. The femto base station 4 receives the measurement result of Pmacro and processes it in a radio network control data setting unit 37. The setting procedure of RTWP_target performed after that may be the same as that of any one of the first to fourth exemplary embodiments, and therefore duplicated explanation is omitted.

[Other Exemplary Embodiments]

Although the mobile stations 7-1 to 7-4 perform data transmission/reception with the macro base station 3 and with the femto base station 4 in the above-described first to fifth exemplary embodiments, each of these mobile stations does not necessarily have to be a mobile radio station and may be a radio station fixed in a certain place.

Further, in the first to fifth exemplary embodiments, examples where the femto base station 4 simultaneously performs communication with a plurality of mobile stations 7-2 to 7-4 are shown. However, the femto base station 4 is not necessarily able to communicate with more than one mobile station.

Further, in the first to fifth exemplary embodiments, examples where the femto base station 4 performs data transmission/reception with the mobile stations 7-2 to 7-4 and controls the transmission power of the mobile stations 7-2 to 7-4 based on the reception quality of a pilot signal from other base stations (specifically macro base station 3) are explained. However, the radio station, which has functions of performing data transmission/reception with at least one mobile station and controlling the transmission power of at least one mobile station based on the reception quality of a pilot signal from other base stations, is not necessarily a base station such as a femto base station 4. For example, the radio station having the above-described functions may be a radio communication terminal that is equipped with an operation button, a keyboard, a microphone, a speaker and the like, and is available for a user. Such embodiments may be effective, for example, in the case where a plurality of mobile stations perform ad-hoc communication without the intervention of the macro base station 3 within the macrocell 5 formed by the macro base station 3. That is, it is possible to suppress the interference between the uplink of a mobile station communicating with the macro base station 3 and a communication channel used between mobile stations performing ad-hoc communication.

Further, the setting procedure of the target received power RTWP_target performed by the femto base station 4 described in the first to fifth exemplary embodiments can be implemented by executing a program for base-station control in a computer such as a microprocessor. In the case of the first exemplary embodiment, for example, the measurement of the reception level Pmacro of a pilot signal from the macro base station 3 may be carried out by the mobile-station mode receiving unit 36 based on the control of a computer executing a base-station control program. Further, the computer may calculate the target received power RTWP_target by using the measured Pmacro, and the transmission power control for the mobile stations 7-2 to 7-4 may be performed based on the control by computer.

Such a program can be stored in various types of recording media, and can be transferred through various communication media. Examples of recording media include flexible disks, hard disk drives, magnetic disks, magneto-optic disks, CD-ROMs, DVDs, ROM cartridges, RAM memory cartridges with battery backup, flash memory cartridges, and non-volatile RAM cartridges. Further, examples of communication media include wired communication media such as telephone lines, radio communication media such as microwave lines, and the Internet.

Further, the present invention is not limited to the above-described exemplary embodiments, and needless to say, various modifications can be made within the limits that do not depart from the spirit of the present invention described above.

This application is based upon and claims the benefit of priority from Japanese patent application No. 2007-312258, filed on Dec. 3, 2007, the disclosure of which is incorporated herein in its entirety by reference.

Industrial Applicability

The present invention relates to a radio communication system including a radio station, in particular a radio communication system in which at least a radio station autonomously performs radio resource management for an uplink, a communication control method, a radio station, and a recording medium.

The invention claimed is:

1. A radio communication system comprising:
a first base station that transmits a first pilot signal within a first cell formed by the first base station itself; and
a second base station that communicates with a mobile station, and controls transmission power, including adjusting a target signal quality of an uplink radio signal transmitted to the second base station from the mobile station based on reception quality of a pilot signal transmitted from the first base station.

2. The radio communication system according to claim 1, wherein the second base station allows the transmission power to be set to a larger value as the reception quality of the first pilot signal becomes lower.

3. The radio communication system according to claim 1, wherein the second base station forms a layered small-scale cell within the first cell formed by the first base station and communicates with the mobile station within the small-scale cell.

4. The radio communication system according to claim 1, wherein
the first base station is a macro base station, and
the second base station is one of a micro base station, a pico base station, and a femto base station.

5. The radio communication system according to claim 1, wherein the second base station is a femto base station that communicates with a pre-registered mobile station, and
the first base station is one of a macro base station, a micro base station, and a pico base station.

6. The radio communication system according to claim 1, wherein the second base station is a communication terminal including an information input/output unit, the communication terminal being used by a user.

7. The radio communication system according to claim 1, wherein a CDMA (Code Division Multiple Access) mode is used as a radio access mode between the second base station and the mobile station.

8. The radio communication system according to claim 7, wherein the transmission power of the uplink signal transmitted by the mobile station is controlled so as to be maximized within a range in which a total amount of received power of all uplink signals in the second base station remains below a target uplink received power determined based on the reception quality of the pilot signal.

9. The radio communication system according to claim 1, wherein information is transmitted between the second base station and the mobile station by using at least one resource block among a plurality of resource blocks, the plurality of resource blocks being obtained by dividing a radio frequency band.

10. The radio communication system according to claim 9, wherein
the transmission power in the uplink data transmission by the mobile station is controlled on each resource block.

11. The radio communication system according to claim 1, wherein the second base station measures the reception quality of the first pilot signal by the second base station itself.

12. The radio communication system according to claim 1, wherein
the mobile station measures the reception quality of the first pilot signal and notifies a measurement result to the second base station.

13. A communication control method in a second base station that is used with a first base station in a radio communication system and performs radio communication with a mobile station, the communication control method comprising:
controlling, by the second base station, transmission power, including adjusting a target signal quality of an uplink radio signal transmitted to the second base station from the mobile station based on reception quality of a pilot signal transmitted from the first base station.

14. The communication control method according to claim 13, wherein the controlling includes allowing the transmission power to be set to a larger value as the reception quality of the pilot signal becomes lower.

15. The communication control method according to claim 13, wherein the reception quality is measured by the second base station itself.

16. The communication control method according to claim 13, wherein a measurement result of the reception quality is received by the second base station from the mobile station.

17. The communication control method according to claim 13, wherein the second base station forms a layered small-scale cell within a large-scale cell formed by the first base station and communicates with the mobile station within the small-scale cell.

18. A base station apparatus that is used with another base station in a radio communication system and performs radio communication with a mobile station, the base station apparatus comprising:
a transceiver being configured to communicate with the mobile station; and
a controller being configured to control transmission power, including adjusting a target signal quality of an uplink radio signal transmitted to the base station apparatus from the mobile station based on reception quality of a pilot signal transmitted from the other base station.

19. The radio station according to claim 18, wherein the controller allows the transmission power to be set to a larger value as the reception quality of the pilot signal becomes lower.

20. The radio station according to claim 18, wherein
a radio access mode between the base station apparatus and the mobile station is a CDMA (Code Division Multiple Access) mode,
the controller controls the transmission power of the uplink signal transmitted by the mobile station so as to be maximized within a range in which a total amount of received power of all uplink signals in the base station apparatus remains below a target uplink received power determined based on the reception quality of the pilot signal.

21. The radio station according to claim 18, wherein
information is transmitted between the base station apparatus and the mobile station by using at least one resource block among a plurality of resource blocks, the plurality of resource blocks being obtained by dividing a radio frequency band, and
the controller controls the transmission power of each resource block in the uplink data transmission by the mobile station.

22. A non-transitory recording medium storing a program that causes a computer to execute control processing relating to a second base station, the second base station being used with a first base station in a radio communication system and configured to communicate with a mobile station, the control processing comprising:
controlling, by the second base station, transmission power, including adjusting a target signal quality of an uplink radio signal transmitted to the second base station from the mobile station based on reception quality of a pilot signal transmitted from the first base station.

23. The recording medium according to claim 22, wherein the controlling includes allowing the transmission power to be set to a larger value as the reception quality of the pilot signal becomes lower.

24. A base station apparatus that is used with another base station in a radio communication system and performs radio communication with a mobile station, the base station apparatus comprising:
radio transmission/reception means for communicating with the mobile station; and
control means for controlling transmission power, including adjusting a target signal quality of an uplink radio signal transmitted to the base station apparatus from the mobile station based on reception quality of a pilot signal transmitted from the other base station.

25. The base station apparatus according to claim 18, further comprising a control data setting unit being configured to set target uplink received power in the base station apparatus based on the reception quality of the pilot signal; wherein
the controller controls the transmission power of the uplink radio signal transmitted by the mobile station in accordance with the target uplink received power.

* * * * *